(12) United States Patent
Aiyama et al.

(10) Patent No.: US 8,191,377 B2
(45) Date of Patent: Jun. 5, 2012

(54) HEAT SOURCE APPARATUS AND METHOD OF STARTING THE APPARATUS

(75) Inventors: Masayuki Aiyama, Shizuoka (JP); Shouji Kikuchi, Shizuoka (JP); Kyuuhei Ishibane, Shizuoka (JP); Yoshikazu Ishiki, Shizuoka (JP); Mitsue Okamoto, Shizuoka (JP)

(73) Assignee: Hitachi Appliances, Inc., Tokyo (JP)

( * ) Notice: Subject to any disclaimer, the term of this patent is extended or adjusted under 35 U.S.C. 154(b) by 108 days.

(21) Appl. No.: 12/641,364

(22) Filed: Dec. 18, 2009

(65) Prior Publication Data

US 2010/0089084 A1   Apr. 15, 2010

Related U.S. Application Data

(62) Division of application No. 11/447,987, filed on Jun. 7, 2006.

(30) Foreign Application Priority Data

Sep. 21, 2005   (JP) ................. 2005-273672

(51) Int. Cl.
*F25B 41/06* (2006.01)
*F25B 41/04* (2006.01)
(52) U.S. Cl. .......................................... 62/225; 62/210
(58) Field of Classification Search ............ 62/222, 62/225, 208, 209, 210; 236/92 B
See application file for complete search history.

(56) References Cited

U.S. PATENT DOCUMENTS

| | | | | |
|---|---|---|---|---|
| 2,016,967 A | * | 10/1935 | Komers ...................... | 248/96 |
| 3,196,900 A | * | 7/1965 | Catheron al. ............. | 137/487.5 |
| 3,307,824 A | * | 3/1967 | Weisheit ................... | 251/129.05 |

(Continued)

FOREIGN PATENT DOCUMENTS

CN   1266975   9/2000

(Continued)

OTHER PUBLICATIONS

Japanese Office Action; Mailing Date: Mar. 23, 2010; Japanese Patent Application No. 2005-273672.
Cengel and Boles Thermodynamics: an Engineering Approach International Edition 2004 McGraw-Hill Appendix 2, tables A-11E through A-14E.
Final Office Action in copending U.S. Appl. No. 11/447,987.

*Primary Examiner* — Frantz Jules
*Assistant Examiner* — Alexis Cox
(74) *Attorney, Agent, or Firm* — Antonelli, Terry, Stout & Kraus, LLP.

(57) ABSTRACT

After a chiller unit is started, an opening command of 10 pulses is output to an electronic expansion valve, and after a predetermined period of time (at the time of starting with unload) elapses, an opening command of 100 to 150 pulses is output to open the electronic expansion valve up to a predetermined opening degree. Thereafter, a discharge side refrigerant super-heat TdSH is monitored and a closing command of 1 pulse/sec is output to the electronic expansion valve to drive the same in a closing direction in a short time until TdSH becomes 20 K. After TdSH has reached 20 K, a closing command of 1 pulse/3 sec is output to the electronic expansion valve, until TdSH becomes 25 K, to drive the electronic expansion valve 3 at a smaller speed in the closing direction than that speed in the closing direction until TdSH becomes 20 K. After TdSH reaches 25 K, it is judged that an operation has shifted to a stable operation, and the opening degree of the electronic expansion valve is controlled while a suction side refrigerant super-heat TsSH is monitored.

14 Claims, 4 Drawing Sheets

U.S. PATENT DOCUMENTS

| | | | | |
|---|---|---|---|---|
| 3,828,814 A | * | 8/1974 | Neumann et al. | 137/486 |
| 4,121,618 A | * | 10/1978 | Sweeney | 137/412 |
| 4,484,452 A | | 11/1984 | Houser, Jr. | |
| 4,644,756 A | * | 2/1987 | Sugimoto et al. | 62/160 |
| 4,697,431 A | * | 10/1987 | Alsenz | 62/225 |
| 4,905,894 A | * | 3/1990 | Noguchi | 237/2 B |
| 4,911,192 A | * | 3/1990 | Hartfiel et al. | 137/14 |
| 5,168,715 A | * | 12/1992 | Nakao et al. | 62/181 |
| 5,203,179 A | * | 4/1993 | Powell | 62/180 |
| 5,271,238 A | * | 12/1993 | Powell et al. | 62/228.4 |
| 5,351,705 A | * | 10/1994 | Reinders et al. | 137/12 |
| 5,369,958 A | * | 12/1994 | Kasai et al. | 62/158 |
| 5,627,770 A | * | 5/1997 | Barbier et al. | 702/130 |
| 5,709,094 A | * | 1/1998 | Ooyabu et al. | 62/126 |
| 6,062,256 A | * | 5/2000 | Miller et al. | 137/487.5 |
| 6,192,696 B1 | * | 2/2001 | Shimamoto et al. | 62/209 |
| 6,321,549 B1 | * | 11/2001 | Reason et al. | 62/223 |
| 6,711,911 B1 | | 3/2004 | Grabon et al. | |
| 7,509,817 B2 | * | 3/2009 | Hwang et al. | 62/210 |
| 7,775,057 B2 | * | 8/2010 | VanderZee | 62/222 |
| 8,020,395 B2 | * | 9/2011 | Kotani et al. | 62/225 |
| 2002/0069916 A1 | * | 6/2002 | Ferguson et al. | 137/487.5 |
| 2002/0117212 A1 | * | 8/2002 | Vyers et al. | 137/487.5 |
| 2003/0010046 A1 | * | 1/2003 | Freund et al. | 62/222 |
| 2003/0183279 A1 | * | 10/2003 | Chang | 137/487.5 |
| 2004/0191711 A1 | * | 9/2004 | Watson et al. | 431/12 |
| 2005/0173003 A1 | * | 8/2005 | Laverdiere et al. | 137/487.5 |
| 2006/0021362 A1 | * | 2/2006 | Sadegh et al. | 62/129 |
| 2006/0112702 A1 | * | 6/2006 | Martin et al. | 62/180 |
| 2006/0144059 A1 | * | 7/2006 | Kang et al. | 62/129 |
| 2006/0162358 A1 | | 7/2006 | VanderZee | |
| 2006/0201171 A1 | | 9/2006 | Unger et al. | |
| 2008/0216500 A1 | * | 9/2008 | Chen et al. | 62/225 |
| 2009/0090118 A1 | * | 4/2009 | Pham et al. | 62/228.5 |
| 2009/0165482 A1 | | 7/2009 | Ko et al. | |
| 2011/0155816 A1 | * | 6/2011 | Jeong et al. | 236/92 B |
| 2011/0203298 A1 | * | 8/2011 | Kim et al. | 62/79 |
| 2011/0232311 A1 | * | 9/2011 | Korenaga et al. | 62/222 |

FOREIGN PATENT DOCUMENTS

| | | |
|---|---|---|
| JP | 5-196309 | 8/1993 |
| JP | 8-61815 | 3/1996 |
| JP | 2003-106610 | 4/2003 |
| JP | 2003314907 A * | 11/2003 |
| JP | 2005-055163 | 3/2005 |

* cited by examiner

HEAT SOURCE APPARATUS AND METHOD OF STARTING THE APPARATUS

INCORPORATION BY REFERENCE

This application is a divisional application of Ser. No. 11/447,987, filed Jun. 7, 2006, the content of which is incorporated herein by reference, which claims priority from Japanese application JP2005-273672 filed on Sep. 21, 2005, the content of which is hereby incorporated by reference into this application.

BACKGROUND OF THE INVENTION

The present invention relates to a water-cooled or air-cooled type heat source apparatus having a refrigerating cycle, in which an electronic expansion valve automatically adjusts an amount of a refrigerant flowing into an evaporator according to an operating state, and a method of starting the apparatus.

In a refrigerating apparatus which is a heat source apparatus, a compressor, a condenser, an electronic expansion valve, and an evaporator are provided.

A temperature detector detects super-heat of a refrigerant sucked into the compressor and an opening degree of the electronic expansion valve is controlled so that the detected super-heat falls in a predetermined range.

Hereupon, super-heat of a refrigerant sucked into the compressor assumes a relatively small value in the order of 3 to 5 K. Therefore, taking account of a detection error in the temperature detector, control of an opening degree of the electronic expansion valve involves a large error due to a detected temperature of the temperature detector, so that the compressor may be damaged due to liquid back.

Hereupon, JP-A-2003-106610 describes a technology, in which attention is paid to the fact that a super-heat of a refrigerant discharged from a compressor assumes a relatively large value of around 25 K and an opening degree of an electronic expansion valve is controlled in view of not only a suction super-heat but also a discharge super-heat.

That is, there is disclosed a technology of judging whether a suction super-heat as detected is larger or smaller than an actual super-heat, from a discharge super-heat, and changing a control target value of suction super-heat to control.

By the way, a screw chiller unit employing a conventional electronic expansion valve adopts control, in which after the electronic expansion valve is opened at a predetermined opening degree at the time of starting, an opening degree of the electronic expansion valve is decreased according to super-heat of refrigerant at a suction side of the compressor.

In this case, a speed, at which an opening degree of the electronic expansion valve is decreased, is difficult to control since it is necessary to avoid freezing of water or brine in an evaporator, which is caused when pressure and temperature of a refrigerant rapidly decrease.

Consequently, it takes time in closing the electronic expansion valve until a unit operates stably.

Accordingly, it is feared that an operation is prolonged in a state, in which liquid back to a screw compressor is apt to occur, to cause shortage of an oil film on a rotor part in the screw compressor, and there is a possibility that damage is given to a screw rotor.

Hereupon, while it is conceivable to use the technology described in JP-A-2003-106610 to control an opening degree of an electronic expansion valve, correction of a detection error of a suction side super-heat can be achieved but it is difficult to realize shortening of an operating time from starting till a stable operation.

Further, when a pseudo azeotropic refrigerant such as R410A, R134A, R404A, R32, R22, etc. or a single refrigerant is used as a refrigerant, temperature gradient is absent in a gas-liquid saturation region. Therefore, since temperature is constant at a certain pressure, at what refrigerant dryness a refrigerant is sucked into a compressor is not understandable in a state, in which a compressor suction side refrigerant super-heat is negative (compressor suction gas temperature<saturation temperature at compressor suction pressure), that is, a state of liquid back, so that there is a fear that control becomes difficult such as rapidly excessive throttling of an opening degree of an expansion valve.

SUMMARY OF THE INVENTION

It is an object of the invention to realize a heat source apparatus, which can control an opening degree of an electronic expansion valve and in which a stable operation can be reached in a short period of time after the heat source apparatus is started, without being accompanied by a rapid decrease in suction pressure.

A heat source apparatus according to the invention comprises a refrigerant compressor, a condenser, an electronic expansion valve, an evaporator, a detector for detecting temperature of refrigerant at a suction side of the compressor, a detector for detecting suction pressure of the compressor, a detector for detecting temperature of the refrigerant at a discharge side of the compressor, a detector for detecting discharge pressure of the compressor, and an opening degree control part, which controls an opening degree of the electronic expansion valve on the basis of output values of the temperature detectors and the pressure detectors.

The opening degree control part opens the electronic expansion valve to a predetermined opening degree at the time of starting of the heat source apparatus, drives the electronic expansion valve in a closing direction until a discharge side refrigerant super-heat becomes a predetermined discharge side super-heat, and controls an opening degree of the electronic expansion valve so that a suction side refrigerant super-heat of the compressor becomes a predetermined suction side super-heat, after the discharge side refrigerant super-heat has reached the predetermined discharge side super-heat.

A speed, at which the electronic expansion valve is driven, is made slow as approaching the predetermined discharge side super-heat, and time required from starting until a stable operation is shortened while avoiding a rapid decrease in pressure.

According to the invention, it is possible to realize a heat source apparatus, which can control an opening degree of an electronic expansion valve and in which a stable operation can be reached in a short period of time after the heat source apparatus is started, without being accompanied by a rapid decrease in suction pressure, and a method of starting the heat source apparatus.

Further, in the case where a pseudo azeotropic refrigerant such as R410A, R134A, R404A, R32, R22, etc. or a single refrigerant is used as a refrigerant, a suction side refrigerant super-heat becomes constant in wet compression and a point of suction is not grasped thus interfering with control of an electronic expansion valve, but a point of suction can be deduced by seeing a discharge gas refrigerant super-heat and so it is possible to appropriately control the electronic expansion valve.

DESCRIPTION OF THE PREFERRED EMBODIMENTS

Figure 1:
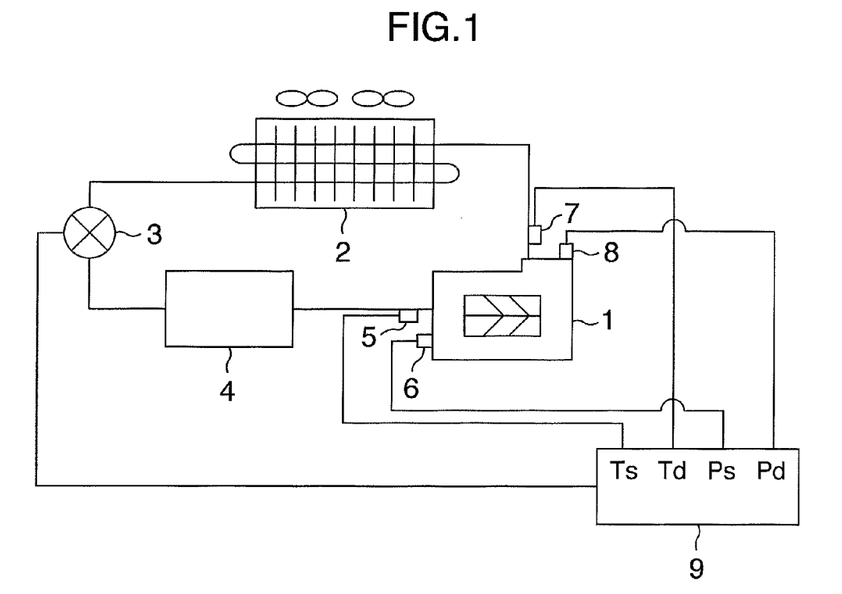
FIG. 1 is a view showing a schematic construction of an air-cooling type screw chiller unit which is a heat source apparatus, to which the invention is applied.

FIG. 1 is a view showing a schematic construction of an air-cooling type screw chiller unit which is a heat source apparatus, to which the invention is applied, and mainly showing a pipe line system diagram and component parts related to control of an electronic expansion valve.

In FIG. 1, a refrigerant system is formed by a screw compressor 1, an air side heat exchanger (condenser) 2, an electronic expansion valve 3 and a water side heat exchanger (evaporator) 4. Further, a control system is formed by a detector 5 for detecting temperature (Ts) of compressor suction gas, a detector 6 for detecting compressor suction pressure (Ps), a detector 7 for detecting temperature (Td) of compressor discharge gas, a detector 8 for detecting compressor discharge pressure (Pd), and an arithmetic processing part (opening degree control part) 9 that processes information from the detectors 5 to 8 to issue an opening degree command to the electronic expansion valve 3.

The arithmetic processing part 9 calculates a suction side refrigerant super-heat, described later, from a detected temperature of the compressor suction gas temperature detector 5 and a detected gas pressure value of the compressor suction pressure detector 6.

Further, the arithmetic processing part 9 calculates a discharge side refrigerant super-heat, described later, from a detected temperature of the compressor discharge gas temperature detector 7 and a detected gas pressure value of the compressor discharge pressure detector 8.

Figure 2:
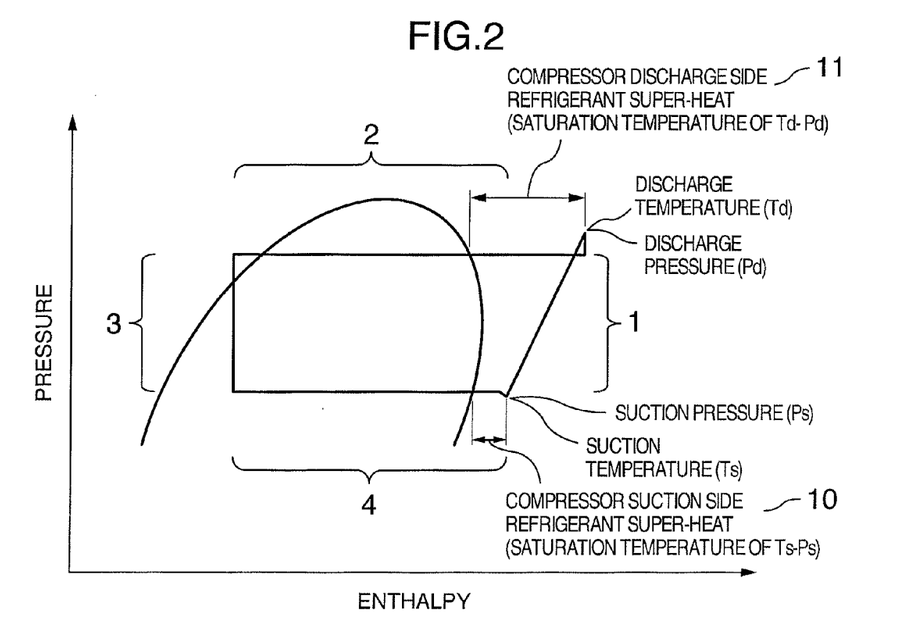
FIG. 2 is a view illustrating an example of a pressure-enthalpy diagram of a refrigerant.

FIG. 2 is a view illustrating an example of a pressure-enthalpy diagram of a refrigerant.

An operating state of a fundamental refrigerating cycle will be described below with reference to FIGS. 1 and 2.

A high-temperature and high-pressure gas refrigerant compressed by the compressor 1 is condensed into a high-pressure liquid refrigerant by the air side heat exchanger 2 and changed into a low-pressure liquid rich gas-liquid mixed refrigerant by the electronic expansion valve 3.

The refrigerant is evaporated in the water side heat exchanger 4 to become a low-pressure gas refrigerant to flow again into the compressor 1.

Here, (suction gas temperature of the compressor 1—saturation temperature for suction pressure of the compressor 1) is made a suction side refrigerant super-heat 10 of the compressor 1, and (compressor discharge gas temperature—saturation temperature for compressor discharge pressure) is made a discharge side refrigerant super-heat 11 of the compressor.

At the time of starting, since there occurs a rapid pressure and temperature change in refrigerating cycle, control is carried out, in which an opening degree of the electronic expansion valve 3 is once somewhat increased and the expansion valve 3 is gradually throttled from an operation of a little wet compression, in view of a follow-up property of the electronic expansion valve 3.

Originally, for a stable operation of the unit, it is requested to control an opening degree of the electronic expansion valve 3 so that the compressor 1 sucks a refrigerant gas, for which a suction side refrigerant super-heat 10 of the compressor 1 is made 3 to 5 K.

Figure 3:
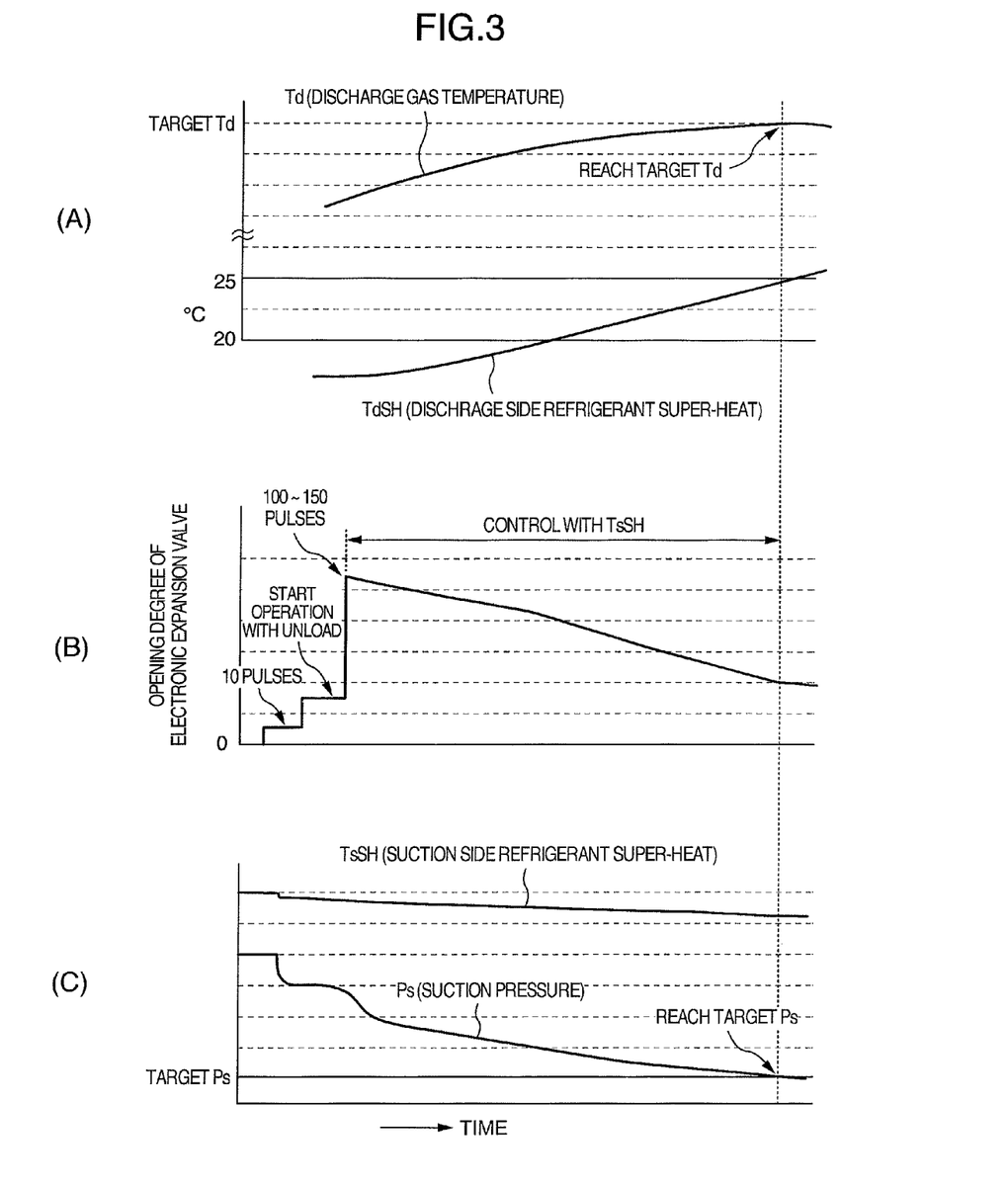
FIG. 3 is a view illustrating control of an opening degree of a general electronic expansion valve at the time of starting, for comparison with the invention.

FIG. 3 is a view illustrating control of an opening degree of a general electronic expansion valve at the time of starting, for comparison with the invention. FIG. 3(A) indicates a discharge gas temperature Td and a discharge side refrigerant super-heat TdSH on an axis of ordinate and indicates time on an axis of abscissas. Further, FIG. 3(B) indicates an opening degree of an electronic expansion valve on an axis of ordinate and indicates time on an axis of abscissas. Further, FIG. 3(C) indicates a suction side refrigerant super-heat TsSH and a suction pressure Ps on an axis of ordinate and indicates time on an axis of abscissas.

In a general opening degree control of an electronic expansion valve 3, a suction side refrigerant super-heat 10 of the compressor 1 is monitored immediately after starting as shown in FIG. 3(C) and an opening degree of the expansion valve 3 is gradually throttled to attain a stable operation of the unit.

More specifically, as shown in FIG. 3(B), an opening command of 10 pulses is output to the electronic expansion valve 3, an opening command of 100 to 150 pulses is output after a predetermined period of time elapses (at the time of starting operation with unload), and after the electronic expansion valve is opened to a predetermined opening degree, and while monitoring the suction side refrigerant super-heat, the electronic expansion valve 3 is driven in a closing direction.

In this case, there are accordingly caused various problems that since a suction pressure decreases rapidly when the opening degree is rapidly made small as described above, a speed in that direction, in which the electronic expansion valve 3 is decreased in opening degree, cannot but be made slow, so that it takes a long time until a stable state of operation is attained.

Here, in view of an error in temperature detection, it is also possible to correct a suction side detected temperature while monitoring a discharge side refrigerant super-heat as shown in FIG. 3(A). While an accuracy in detection of a suction side detected temperature is improved, however, a speed in that direction, in which the electronic expansion valve 3 is decreased in opening degree, cannot but be still made slow, so that a long time is needed until a stable state of operation is attained.

Figure 4:
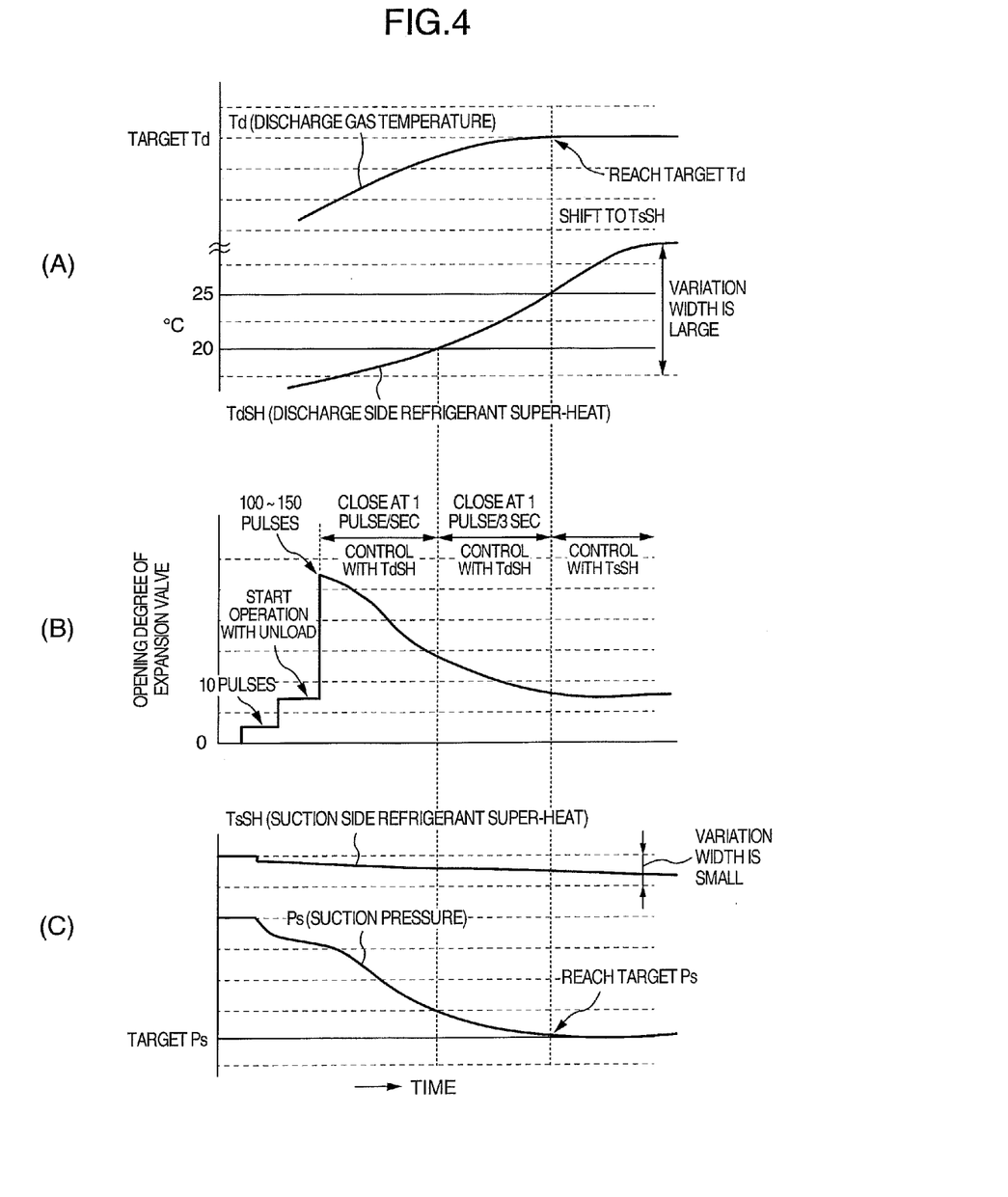
FIG. 4 shows graphs illustrating control of an opening degree of an electronic expansion valve according to an embodiment of the invention.

In contrast to general control of an opening degree of the electronic expansion valve illustrated in FIG. 3, control (control by the arithmetic processing part 9) of an opening degree of an electronic expansion valve according to an embodiment of the invention is performed as shown in FIG. 4. FIG. 4(A) indicates a discharge side gas temperature Td and a discharge side refrigerant super-heat TdSH on an axis of ordinate and indicates time on an axis of abscissas.

Further, FIG. 4(B) indicates an opening degree of the electronic expansion valve on an axis of ordinate and indicates time on an axis of abscissas. Further, FIG. 4(C) indicates a suction side refrigerant super-heat TsSH and a suction pressure Ps on an axis of ordinate and indicates time on an axis of abscissas.

As shown in FIGS. 1 and 4, by making use of the compressor discharge side refrigerant super-heat 11 calculated from values (Td, Pd) detected by the compressor discharge gas temperature detector 7 and the compressor discharge pressure detector 8, adjustment of an opening degree is made by control of the electronic expansion valve with a discharge side refrigerant super-heat 11 until the discharge side refrigerant super-heat 11 exceeds, for example, 25 K at the time of starting, and when it exceeds 25 K, it is judged that an operation has shifted to a stable operation of the unit, and control is then shifted to control of a suction side refrigerant super-heat 10.

That is, as shown in FIG. 4(B), after the air-cooling type screw chiller unit is started, an opening command of 10 pulses is output to the electronic expansion valve 3 and after a predetermined period of time elapses (at the time of starting operation with unload), an opening command of 100 to 150 pulses is output. Then the electronic expansion valve is opened up to a predetermined opening degree.

Thereafter, a discharge side refrigerant super-heat TdSH is monitored, and until TdSH becomes 20 K (first super-heat), a closing command of 1 pulse/sec (first period) is output to the electronic expansion valve 3 to drive the electronic expansion valve 3 in a closing direction in a short time.

After the discharge side refrigerant super-heat TdSH reaches 20 K, a closing command of 1 pulse/3 sec (second period) is output to the electronic expansion valve 3, until the discharge side refrigerant super-heat TdSH becomes 25 K (a predetermined discharge side super-heat), to drive the electronic expansion valve 3 at a smaller speed in the closing direction than that speed in the closing direction until TdSH becomes 20 K.

After TdSH reaches 25 K, it is judged that an operation has shifted to a stable operation, and an opening degree of the electronic expansion valve 3 is controlled while a suction side refrigerant super-heat TsSH is monitored.

According to an embodiment of the invention, it is possible to throttle the electronic expansion valve 3 relatively roughly at a fast speed in control of an opening degree of the electronic expansion valve 3 at the time of starting of the unit without rapidly decreasing the low pressure until the discharge side refrigerant super-heat 11 can ensure a certain level, thus enabling making a stable state of the chiller unit reach a point of stable operation in refrigerating cycle.

In a normal operation of a heat source apparatus, while a suction side refrigerant super-heat 10 is 3 to 5 K, a discharge side refrigerant super-heat 11 becomes around 30 to 40 K, so that the discharge side refrigerant super-heat 11 is smaller in ratio of an error to a control target value than the suction side refrigerant super-heat when it is assumed that temperature error of the temperature detectors 5, 7 and the arithmetic processing part 9 is tentatively ±1° C. Therefore, it is effective to adjust an opening degree of the electronic expansion valve 3 at the time of starting with a discharge side refrigerant super-heat 11 and to control such opening degree with a suction side refrigerant super-heat 10 after having approached a condition of stable operation in shortening a time until a stable operation from starting of the unit and ensuring reliability of the screw compressor 1.

In addition, according to results of examination made by the inventors of the present application, time required from starting until a stable operation by the general electronic expansion valve control upon starting, shown in FIG. 3 amounts to 30 minutes or longer while time required from starting until a stable operation by the electronic expansion valve control upon starting of the invention, shown in FIG. 4 is shortened to around 15 minutes.

Further, in the case where a pseudo azeotropic refrigerant such as R410A, R134A, R404A, R32, R22, etc. or a single refrigerant is used for the refrigerant, a suction side refrigerant super-heat 10 becomes constant in wet compression and a point of suction is not grasped thus interfering with control of an electronic expansion valve, but a point of discharge is made clear by seeing a discharge gas refrigerant super-heat 11 and a standard is also set up for a point of suction, thus producing an effect that the electronic expansion valve 3 can be appropriately controlled in a direction, in which liquid compression is not made.

Subsequently, an explanation will be given to a control action in control of an opening degree of the electronic expansion valve upon starting, shown in FIG. 4 in the case where a suction pressure Ps detected by the suction pressure detector 6 is monitored by the arithmetic processing part 9 and decreased below a target pressure value Ps while an opening degree of the electronic expansion valve 3 is controlled according to a discharge side refrigerant super-heat.

Figure 5:
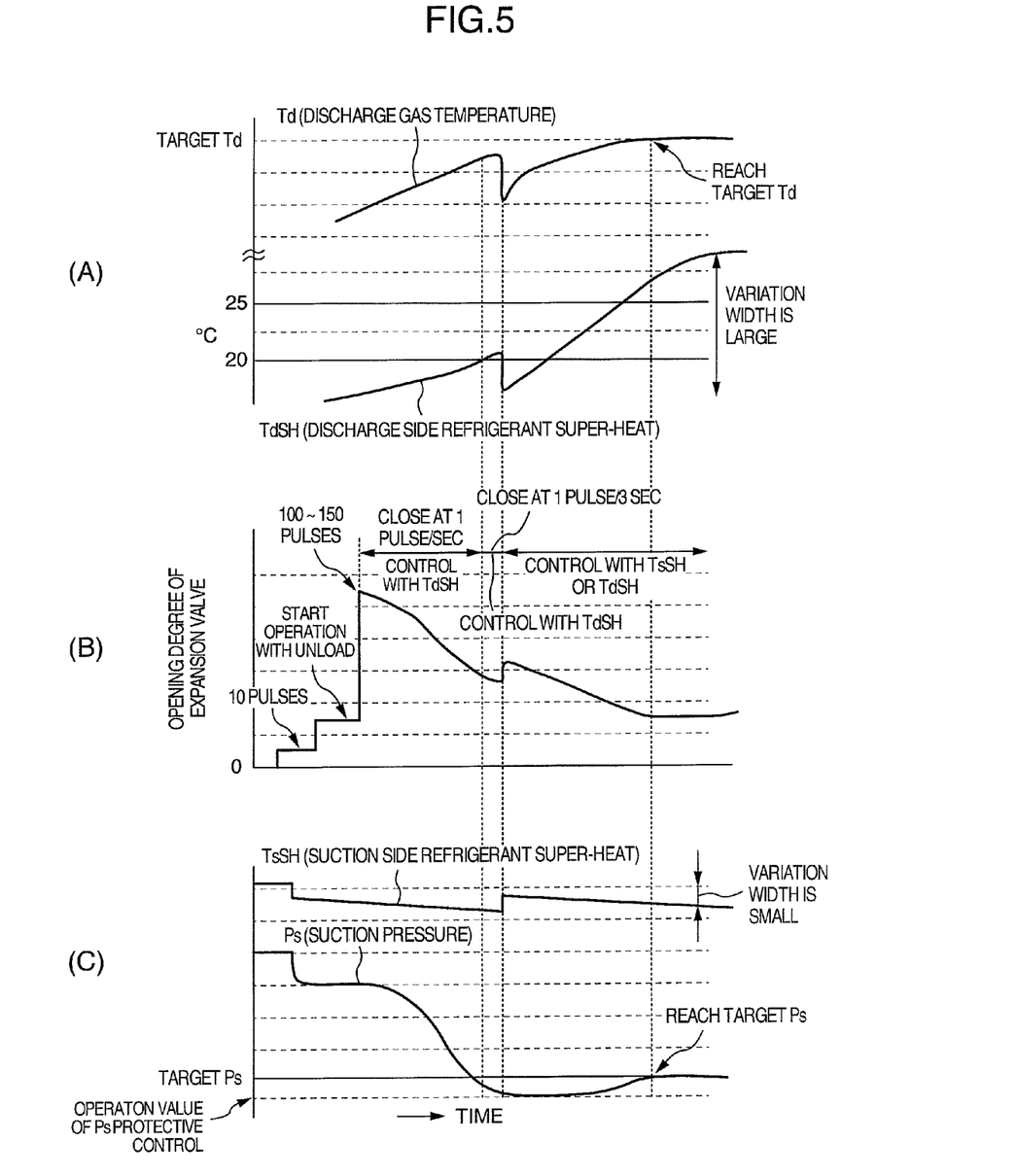
FIG. 5 shows graphs illustrating control of an opening degree of an electronic expansion valve at the time of start-up control and in the case where a suction pressure decreases rapidly, in an embodiment of the invention.

FIG. 5 is a view showing an example of a control action in the case where a suction pressure is decreased while an opening degree of the electronic expansion valve is controlled according to the discharge side refrigerant super-heat described above.

For example, in the case where a command of 1 pulse/sec makes a discharge side refrigerant super-heat reach 20 K from the time of starting and a suction pressure Ps becomes less than a Ps protective control operation value after shift to a command of 1 pulse/3 sec, an opening degree of the electronic expansion valve 3 is increased by a predetermined value to prevent a decrease in suction pressure to raise the same toward a target value.

Then a suction side refrigerant super-heat is monitored whereby control is shifted to one, in which an opening degree of the electronic expansion valve 3 is adjusted.

In this manner, in the case where a suction side pressure Ps is monitored and becomes less than the Ps protective control operation value at the time of starting, start-up control of a heat source apparatus can be performed further safely by forcedly opening the electronic expansion valve 3 by a predetermined value and controlling the electronic expansion valve again in the closing direction.

Further, in the case where even after an operating state becomes stable, the discharge side refrigerant super-heat is monitored and the discharge side refrigerant super-heat becomes less than, for example, 20 K, or the suction side refrigerant super-heat becomes less than 3 K, the opening degree of the electronic expansion valve 3 is controlled by monitoring the discharge side refrigerant super-heat and when the discharge side refrigerant super-heat reaches 20 K, control is shifted to control of the opening degree of the electronic expansion valve 3 by monitoring the suction side refrigerant super-heat.

Further, when the discharge side refrigerant super-heat becomes less than 20 K after the operating state becomes stable, there is a good possibility that an error in detection is generated on the suction side refrigerant super-heat detector 5.

Hereupon, a set value of the suction side refrigerant super-heat is automatically reset much (for example, a set value of a control target super-heat is changed from 3 K to 5 K) as the automatic temperature correcting function. It is also possible to control the opening degree of the electronic expansion valve 3 with the suction side refrigerant super-heat, which is changed in setting.

Further, while in the example shown in FIG. 4(A) closing command is fed to the electronic expansion valve 3 in 1 pulse/3 sec until a discharge side refrigerant super-heat becomes 25 K after it becomes 20 K, it is also possible to use another control.

For example, it is also possible to feed a closing command in 1 pulse/2 sec from 20 K to 23 K and to feed a closing command in 1 pulse/3 sec from 23 K to 25 K.

Further, while in the example described above, the closing command is fed in 1 pulse/3 sec until the discharge side refrigerant super-heat becomes 20 K and the closing command is fed to the electronic expansion valve 3 in 1 pulse/3 sec until the discharge side refrigerant super-heat becomes 25 K, another driving methods can be adopted provided that it is possible to drive the electronic expansion valve 3 to close the same at a first speed, which is faster than that in the related art, up to 20 K and to drive the electronic expansion valve 3 to close the same at a second speed, which is slower than the first speed but faster than that in the related art, up to 25 K from 20 K.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of starting a heat source apparatus that includes a compressor, a condenser, an electronic expansion valve, an evaporator, a detector for detecting temperature of refrigerant at a suction-side of the compressor, a detector for detecting suction pressure of the compressor, a detector for detecting temperature of refrigerant at a discharge-side of the compressor, and a detector for detecting discharge pressure of the compressor, the method comprising the following steps:
   opening the electronic expansion valve to a predetermined opening degree at the time of starting of the heat source apparatus;
   driving the electronic expansion valve in a direction in which the electronic expansion valve is closed, until a compressor discharge-side refrigerant super-heat reaches a predetermined temperature for the compressor discharge-side refrigerant super-heat; and
   controlling the opening degree of the electronic expansion valve so that the compressor suction-side refrigerant super-heat reaches a predetermined temperature for the compressor suction-side refrigerant super-heat after the compressor discharge-side refrigerant super-heat has reached the predetermined temperature for the compressor discharge-side refrigerant super-heat;
   wherein said step of driving the electronic expansion valve includes a step of slowing down a closing speed of the electronic expansion valve as the compressor discharge-side refrigerant super-heat approaches the predetermined temperature for the compressor discharge-side refrigerant super-heat;
   wherein said slowing down a closing speed of the electronic expansion valve includes:
   driving the electronic expansion valve at a first speed in the closing direction until the compressor discharge-side refrigerant super-heat reaches a first temperature smaller than the predetermined temperature for the compressor discharge-side refrigerant super-heat, and
   after the compressor discharge-side refrigerant super-heat has reached the first temperature, driving the electronic expansion valve at a second speed, slower than the first speed, until the compressor discharge-side refrigerant super-heat reaches the predetermined temperature for the compressor discharge-side refrigerant super-heat.

2. The method according to claim 1, wherein said slowing down a closing speed of the electronic expansion valve further includes:
   outputting a drive signal for closing the electronic expansion valve for a first period until the compressor discharge-side refrigerant super-heat reaches a first temperature smaller than the predetermined temperature for the compressor discharge-side refrigerant super-heat, and
   after the compressor discharge-side refrigerant super-heat has reached the first temperature, outputting a drive signal for closing the electronic expansion valve for a second period, longer than the first period, until the compressor discharge-side refrigerant super-heat reaches the predetermined temperature for the compressor discharge-side refrigerant super-heat.

3. The method according to claim 1, wherein during said controlling the opening degree of the electronic expansion valve, and
   wherein when a temperature of the compressor discharge-side refrigerant super-heat exceeds a predetermined temperature range for the compressor discharge-side refrigerant super-heat,
   the opening degree of the electronic expansion valve is controlled such that the compressor discharge-side refrigerant super-heat temperature is disposed within the predetermined temperature range for the compressor discharge-side refrigerant super-heat; and
   wherein when a temperature of the compressor suction-side refrigerant super-heat exceeds a predetermined temperature range for the compressor suction-side refrigerant super-heat,
   the opening degree of the electronic expansion valve is controlled such that the compressor suction-side refrigerant super-heat temperature is disposed within the predetermined temperature range for the compressor suction-side refrigerant super-heat.

4. The method according to claim 1, wherein during the driving of the electronic expansion valve, whenever a suction pressure of the compressor becomes less than a predetermined value for the suction pressure of the compressor, the step of driving the electronic expansion valve in a direction in which the electronic expansion valve is closed is interrupted, the electronic expansion valve is driven in an opening direction of the electronic expansion valve to a predetermined opening degree, and then the opening degree of the electronic expansion valve is controlled until the temperature of a compressor suction-side refrigerant super-heat becomes a predetermined temperature of the compressor suction-side refrigerant super-heat.

5. The method according to claim 1, wherein the compressor comprises a screw compressor.

6. The method according to claim 1, wherein the refrigerant comprises a pseudo azeotropic refrigerant or a single refrigerant.

7. The method according to claim 3,
   wherein the opening degree of the electronic expansion valve is controlled such that the compressor suction-side refrigerant super-heat temperature is disposed within the predetermined temperature range for the compressor suction-side refrigerant super-heat, when the compressor discharge-side refrigerant super-heat temperature is disposed within the predetermined temperature range for the compressor discharge-side refrigerant super-heat.

8. A method of starting a heat source apparatus that includes a compressor, a condenser, an electronic expansion valve, an evaporator, a detector for detecting temperature of refrigerant at a suction-side of the compressor, a detector for detecting suction pressure of the compressor, a detector for detecting temperature of refrigerant at a discharge-side of the compressor, and a detector for detecting discharge pressure of the compressor, the method comprising the following steps:

opening the electronic expansion valve to a predetermined opening degree at the time of starting of the heat source apparatus;

driving the electronic expansion valve in a direction in which the electronic expansion valve is closed, until a compressor discharge-side refrigerant super-heat reaches a predetermined temperature for the compressor discharge-side refrigerant super-heat; and controlling the opening degree of the electronic expansion valve so that the compressor suction-side refrigerant super-heat reaches a predetermined temperature for the compressor suction-side refrigerant super-heat after the compressor discharge-side refrigerant super-heat has reached the predetermined temperature for the compressor discharge-side refrigerant super-heat;

wherein said step of driving the electronic expansion valve includes a step of slowing down a closing speed of the electronic expansion valve as the compressor discharge-side refrigerant super-heat approaches the predetermined temperature for the compressor discharge-side refrigerant super-heat;

wherein said controlling the opening degree of the electronic expansion valve includes:

when at least one of: (1) a temperature of the compressor discharge-side refrigerant super-heat exceeds a predetermined temperature range for the compressor discharge-side refrigerant super-heat, and (2) a temperature of the compressor discharge-side refrigerant super-heat exceeds a predetermined temperature range for the compressor discharge-side refrigerant super-heat, changing the predetermined temperature for the compressor suction-side refrigerant super-heat used to control the opening degree of the electronic expansion valve, so that the temperature of the compressor suction-side refrigerant super-heat becomes equivalent to the temperature of the changed predetermined compressor suction-side refrigerant super-heat.

9. The method according to claim 8, wherein said slowing down a closing speed of the electronic expansion valve further includes:

outputting a drive signal for closing the electronic expansion valve for a first period until the compressor discharge-side refrigerant super-heat reaches a first temperature smaller than the predetermined temperature for the compressor discharge-side refrigerant super-heat, and after the compressor discharge-side refrigerant super-heat has reached the first temperature, outputting a drive signal for closing the electronic expansion valve for a second period, longer than the first period, until the compressor discharge-side refrigerant super-heat reaches the predetermined temperature for the compressor discharge-side refrigerant super-heat.

10. The method according to claim 8, wherein during said controlling the opening degree of the electronic expansion valve, and wherein when a temperature of the compressor discharge-side refrigerant super-heat exceeds a predetermined temperature range for the compressor discharge-side refrigerant super-heat, the opening degree of the electronic expansion valve is controlled such that the compressor discharge-side refrigerant super-heat temperature is disposed within the predetermined temperature range for the compressor discharge-side refrigerant super-heat; and wherein when a temperature of the compressor suction-side refrigerant super-heat exceeds a predetermined temperature range for the compressor suction-side refrigerant super-heat, the opening degree of the electronic expansion valve is controlled such that the compressor suction-side refrigerant super-heat temperature is disposed within the predetermined temperature range for the compressor suction-side refrigerant super-heat.

11. The method according to claim 8, wherein during the driving of the electronic expansion valve, whenever a suction pressure of the compressor becomes less than a predetermined value for the suction pressure of the compressor, the step of driving the electronic expansion valve in a direction in which the electronic expansion valve is closed is interrupted, the electronic expansion valve is driven in an opening direction of the electronic expansion valve to a predetermined opening degree, and then the opening degree of the electronic expansion valve is controlled until the temperature of a compressor suction-side refrigerant super-heat becomes a predetermined temperature of the compressor suction-side refrigerant super-heat.

12. The method according to claim 8, wherein the compressor comprises a screw compressor.

13. The method according to claim 8, wherein the refrigerant comprises a pseudo azeotropic refrigerant or a single refrigerant.

14. The method according to claim 10, wherein the opening degree of the electronic expansion valve is controlled such that the compressor suction-side refrigerant super-heat temperature is disposed within the predetermined temperature range for the compressor suction-side refrigerant super-heat, when the compressor discharge-side refrigerant super-heat temperature is disposed within the predetermined temperature range for the compressor discharge-side refrigerant super-heat.

* * * * *